No. 758,064.

Patented April 26, 1904.

UNITED STATES PATENT OFFICE.

WILLIAM A. HALL, OF BELLOWS FALLS, VERMONT, ASSIGNOR TO CASEIN COMPANY OF AMERICA, A CORPORATION OF NEW JERSEY.

CASEIN COMPOSITION AND PROCESS OF PRODUCING SAME.

SPECIFICATION forming part of Letters Patent No. 758,064, dated April 26, 1904.

Application filed February 26, 1903. Serial No. 145,255. (No specimens.)

*To all whom it may concern:*

Be it known that I, WILLIAM A. HALL, a citizen of the United States, residing at Bellows Falls, in the county of Windham and State of Vermont, have invented or discovered certain new and useful Improvements in Casein Compositions and Processes of Producing Same, of which the following is a specification.

Casein compositions are now largely in use for various purposes in which a binding or adhesive ingredient is necessary, and serve as admirable substitutes for animal glues formerly employed for the same purposes—as, for example, in calcimines and in waterproofing and coating compositions for papers—in that as a binding or adhesive composition casein is very much less affected or influenced by moisture or exposure to the weather and is very much cheaper than the animal glues formerly employed; but there are some existing objections in the use of casein solutions as heretofore made which it is desirable to avoid.

This invention or discovery has for its object to provide a casein composition which will make thin cold solutions without requiring the presence of so much water as to objectionably weaken the adhering qualities of the casein, so that when used as a binder or adherent in the uses to which it may be applied the casein solution will have the requisite strength and still be sufficiently thin to work easily when cold. It has been discovered that this result can be secured by combining certain percentages of modified starch or starch which has been subjected to an oxidizing process or which has been treated with an acid or an alkali with the casein, this combination of modified starch and casein resulting in a composition which when dissolved will work quite thin when cold. The percentage of modified starch to be combined with the casein will vary somewhat for different uses of the solution from ten per cent. to twenty-five per cent. or more of the entire composition.

This casein and modified starch composition may be placed on the market mixed in dry condition in the proportions above referred to, the ingredients to be dissolved together when the composition is to be used, or the modified starch and the casein may be dissolved separately and the two solutions then mixed together for use; but for various reasons and in order to obtain the best results the modified starch will preferably be combined with the casein to produce the new binding or adhesive composition by first dissolving the starch in the smallest possible amount of hot water and then adding this modified starch solution to dry granular casein while the latter is being rapidly agitated or stirred. This dry granular casein is highly hygroscopic and readily absorbs the hot solution of starch, which will penetrate each kernel or particle of the casein to some extent, and will surround or adhere to the particles in such a way that a most intimate mixture or combination is obtained. In thus incorporating the hot modified starch solution with the dry granular casein the speed of the agitation and the rapidity of absorption also creates considerable heat, so that when the mass is discharged from the mixer it comes out in a comparatively dry condition and is sufficiently dry to be ready to be packed into barrels as soon as the steam resulting from the hot starch solution and the heat evolved by the mixing process has escaped and the material has become cold.

The casein may be properly alkalized, so that it will be readily soluble either before the modified starch solution is mixed or combined therewith or during the mixing process, and while the alkali, which is applied in the form of a solution, softens the casein somewhat it does not contain a sufficient amount of water to dissolve the casein or to render the same anything more than slightly moist, and the alkali itself has a beneficial effect upon the starch of the composition in that it contributes toward making it more readily soluble.

This improved casein composition when dissolved in water and used as a binder or adhesive composition in paper coating or enameling compounds containing china-clay or other similar mineral bases worked up in water has been found to be very much better than the casein compositions heretofore used for this purpose in that casein solutions containing modified starch work better and more readily for various uses, and particularly when cold, than casein solutions not containing modified starch.

Having thus described my invention or discovery, I claim and desire to secure by Letters Patent—

1. A casein composition consisting of casein, in dry granular form, and the particles or granules of which are impregnated or coated with a solution of modified starch.

2. A casein composition consisting of alkalized casein, in dry granular form, and the particles or granules of which are impregnated or coated with a solution of modified starch.

3. The herein-described process for producing a casein composition, for use as a binding or adhesive composition, consisting in mixing a solution of modified starch with dry granular casein during rapid agitation until the starch solution is absorbed by or thoroughly incorporated with the particles of casein.

4. The herein-described process for producing a casein composition, for use as a binding or adhesive composition, consisting in mixing a solution of modified starch with granular casein during rapid agitation until the starch is absorbed by or thoroughly incorporated with the particles of casein, and alkalizing the casein composition during the mixing process by incorporating an alkaline solution with the other ingredients.

In testimony whereof I affix my signature in presence of two witnesses.

WILLIAM A. HALL.

Witnesses:
FLORENCE J. WALSH,
CHAS. O. DAHL.